Aug. 12, 1924.

L. E. KING

1,505,031

LONG DISTANCE AUTOMATIC SIGNALING MECHANISM

Filed March 15, 1920    3 Sheets-Sheet 2

Inventor
L. E. King,
By Watson E. Coleman
Attorney

Aug. 12, 1924.

L. E. KING

LONG DISTANCE AUTOMATIC SIGNALING MECHANISM

Filed March 15, 1920 — 3 Sheets-Sheet 3

1,505,031

Inventor
L. E. King,
By Watson E. Coleman
Attorney

Patented Aug. 12, 1924.

1,505,031

UNITED STATES PATENT OFFICE.

LECROY E. KING, OF DOUGLAS, ARIZONA.

LONG-DISTANCE AUTOMATIC SIGNALING MECHANISM.

Application filed March 15, 1920. Serial No. 365,936.

*To all whom it may concern:*

Be it known that I, LECROY E. KING, a citizen of the United States, residing at Douglas, in the county of Cochise and State of Arizona, have invented certain new and useful Improvements in Long-Distance Automatic Signaling Mechanisms, of which the following is a specification, reference being had to the accompanying drawings.

This invention relates to signaling mechanism, and particularly to means for signaling and thereby indicating the position of a moving body, such, for instance, as a float.

The general object of this invention is the provision of a device of this character wherein as a float or other body moves in one or the other direction along its predetermined path, its arrival at any position will be electrically indicated or signaled.

A further object is to provide in one unit a mechanism to transmit electrical signals to indicate the changing position of a body or moving object, and in this connection to transmit the various signals indicating the changing position of the body by the use of but one conducting wire or circuit.

A further object is to provide a mechanism of this character which, by the use of but one circuit and source of energy, is adapted to operate a number of signal units and which is adapted to transmit the various signals of various units to one recording instrument common to all the units.

A further object is to provide a mechanism of this character which does not depend on a constant voltage or amperage to be operable, which does not require a multiplication of instruments to indicate the movement of a body through space, which does not act on the principle of a rheostat, and which does not require any strong current, such as a power or light current, to operate it, a battery being sufficient for the purpose.

A further object is to provide a mechanism of this character which includes a screw-threaded shaft carrying a contact member which is moved in one direction or the other by the rotation of the screw-threaded shaft, means connected to the moving body whereby the screw-threaded shaft may be rotated in one direction or the other, and a series of contacts with which the contact finger or member engages in its course of movement, and in this connection to provide a series of contact members in the form of disks which are simultaneously rotated in one direction upon the movement of the element, and which are formed with notches or like depressed and elevated portions which, being arranged in a predetermined order on each disk of the series, will indicate with which of these contact disks the contact finger is in engagement at the moment of rotation.

A further object is to provide a construction of this character wherein a plurality of different signals may be set over the same circuit to an indicating device, the particular signal being sent depending upon the position of a shiftable contact member shifted by the movable body whose position is being indicated.

A further object is to provide a mechanism of the character described with a series of rotatable signaling disks mounted thereon, and a contact finger travelling along or over said disks and actuated by the moving body, and provide spring actuated means for causing the intermittent complete rotation of said disks at predetermined intervals.

A further object is to provide means actuated by the movement of said movable body to cause the constant rewinding of the spring.

A further object is to provide means for causing the steady intermittent movement of the means for rotating said contact members or disks.

Still another object is to provide means for preventing the breakage of the machine in case the contact finger actuating means "runs away."

Other objects will appear in the course of the following description.

My invention is illustrated in the accompanying drawings, wherein:—

Figure 16 is a sectional view through the clutch element 24 on the shaft 15, showing the manner in which the clutch element is mounted on the shaft.

In these drawings, 10 is a base of any suitable material having supporting standards 11, 12 and 13 extending upward therefrom. Rotatably mounted in bearings in the standard 13 is a shaft 14 which terminates at one end in a clutch member 23 of insulating material. A shaft 15 which is screw-threaded at 15$^a$, is mounted in the bearings 11 and 12, and terminates opposite the clutch member 23 with a clutch member 24. The shaft 14 carries upon it a sprocket wheel 16, over which passes a sprocket chain 17, shown in Figure 15 as connected at one end to a weight 18 and at the other end to a float 19. This weight and float are merely illustrative, it being understood that the chain might be connected at one end to any means for retracting it and at its opposite end to a moving body whose position in space is to be indicated. The float 19 will hereafter be considered as the moving body and the weight 18 as the retractile means, the float moving in a tank and the signaling device being shown as indicating the variations in level of the liquid within the tank.

In detail the shaft 14 is supported in a bearing 20 carried by the standard 13 and by a post 21 having a bearing 22. The clutch element 24 which is slidable upon the shaft 15 but keyed thereto, has a circumferential groove operating in connection with a shipper yoke, as will be later stated. When the clutch element 24 is shifted in one direction, it disengages from the clutch element 23, and when it is shifted in the other direction, it engages with the clutch element 23 so that the rotation of the sprocket wheel 16 is transmitted to shaft 15.

Figure 1:
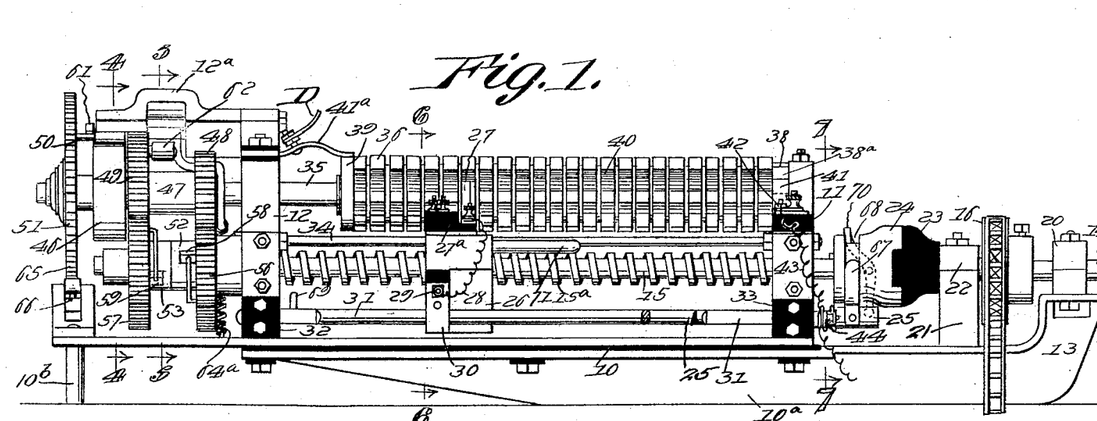
Figure 1 is a front elevation of a signaling mechanism constructed in accordance with my invention.

Extending between the standards or bearing members 11 and 12 and disposed adjacent the base is a sliding rod 25, and slidably engaged with this rod is a slide 26 in the form of a block of insulating material, such as hard fiber, ebonite, etc., or the block might be made of metal if the parts carried thereby are insulated therefrom. This block is internally screw-threaded for engagement by the screw-threads 15$^a$. It will be obvious that as the shaft 15 is rotated in one direction, this sliding block 26 will be shifted longitudinally in one direction, and upon the reverse rotation of the shaft, the sliding block will be shifted in the opposite direction. Carried upon said slide and insulated therefrom, if the slide is of metal, is a two-pronged contact member or finger 27, from which an insulated conductor 28 leads to a binding post 29, electrically engaged with a contact finger 30 which engages with a longitudinally extending metallic rod 31 or bus bar mounted in the supporting members 11 and 12 but insulated therefrom, as by passing through insulating blocks 32 and 33 attached to the supports 11 and 12. These supports are connected rearward of the shaft 14 by a distance bolt 34 holding the bearing members rigid.

Figures 8, 9, 10, 11, 12, 13, 14, 15:
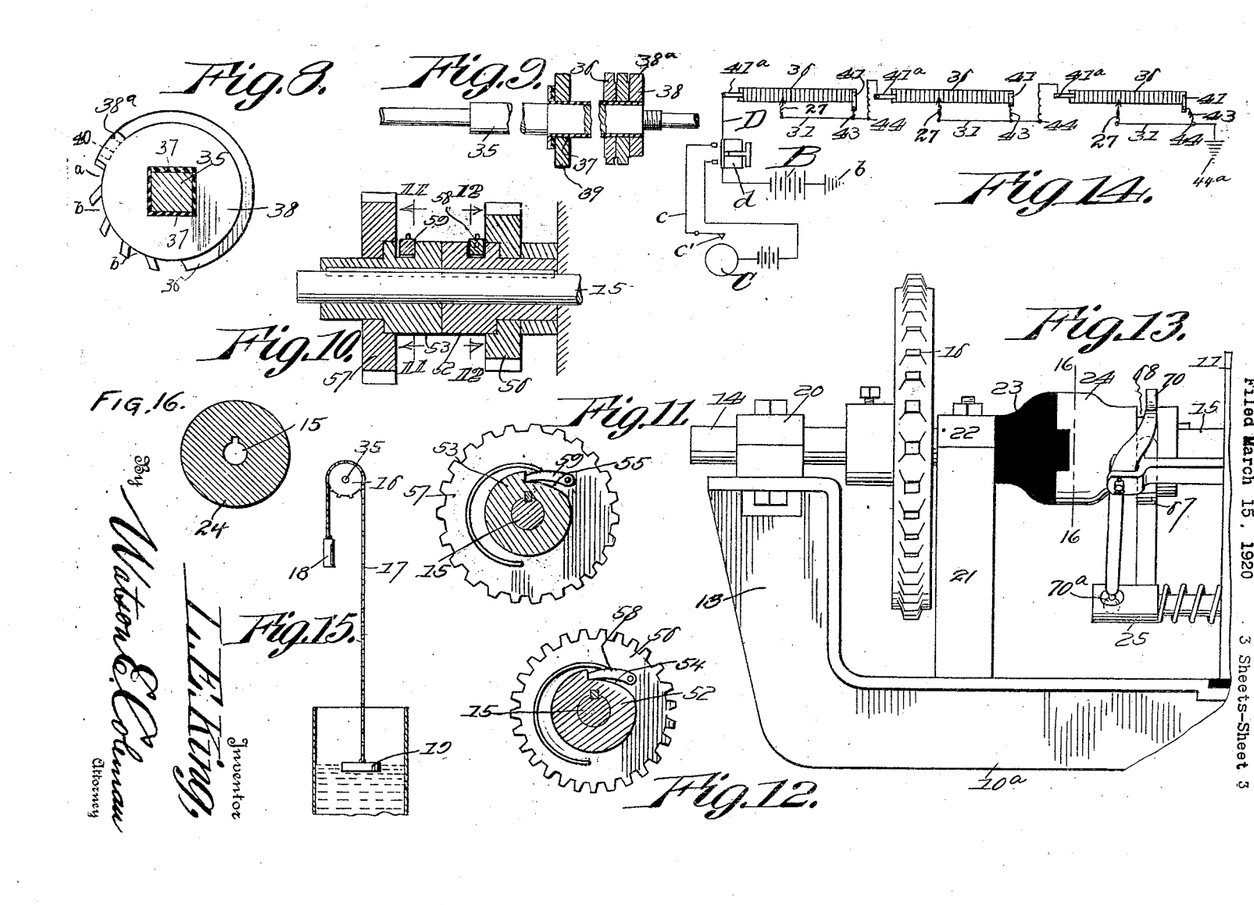
Figure 8 is a fragmentary section through the shaft 35 showing in elevation the disk 38 and one of the disks 36.
Figure 9 is a fragmentary longitudinal section through the disks 36 and 38, the shaft being in elevation.
Figure 10 is a longitudinal section through the gear wheels 56 and 57 and their supporting sleeves.
Figure 11 is a section on the line 11—11 of Figure 10.
Figure 12 is a section on the line 12—12 of Figure 10.
Figure 13 is a rear elevation of one end of the signaling mechanism.
Figure 14 is a diagrammatic view of the electrical connections between the signaling mechanism and the recording mechanism.

Disposed parallel to shaft 15 and mounted in bearings in the supporting members 11 and 12 is a shaft 35 carrying upon it a series of contact disks 36 in electrical contact with each other (see Figure 9) but insulated from the shaft by an insulating sleeve 37. These disks rotate with the shaft and at one end the series of disks is terminated by a metallic disk 38 of smaller diameter than the disks 36 but having a segmental-shaped lug 38$^a$. At the opposite end is a metallic collar 39. The several disks and the members 38 and 39 are held in electrical engagement with each other by suitable nuts, metallic washers and insulating washers. Each disk is formed with a relatively wide groove 40. The disks are arranged so that the grooves are in alignment and thus a continuous groove is formed across the entire face of the roller formed by said disks. Each disk, however, is individually provided with certain notches, as indicated in Figure 8, arranged in a predetermined order to give "make and break" or dot and dash signals, so that as each disk is rotated in contact with the finger 27, the disk will send a predetermined series of electrical impulses through the circuit in which the fingers and disks are arranged. Thus each disk will transmit a certain code number in dots and dashes, for instance, as in accordance with the Morse code or any other desired code. It is to be understood that each disk has its notches differently arranged from other disks and of a different length or in different combination so as to give a different signal from any other disk in the series.

Engaging the contact disk 38 is a spring finger 41 insulated from the support 11 and electrically connected through the binding screw 42 to an insulated conductor 43 extending to a binding screw 44. From this binding screw 44 an electrical connection extends, as shown in Figure 14, to a ground. The rod 31 is likewise connected to the conductor 43 and thus to the ground. Engaging the collar 39 is a wiper 41ª supported in any suitable manner but insulated from its support and provided with a binding screw from which a wire may be taken. Normally the finger 27 projects into the groove 40 and, therefore, does not touch the contacts 36, but at this time the finger 41 engages the lug 38ª and thus a circuit is completed from the recording instrument, through the battery, through the wire 43, the finger 41, thence to the lug 38ª, thence through the several disks 36, to the wiper 41ª, and thence by wire D or other connections back to the recording instrument or to the battery B if the recording instrument is disposed in a local circuit and operated by a relay. If, on the other hand, the shaft 35 is rotated sufficiently to carry the groove 40 beyond the finger 27, this finger will contact with one or another of the disks 36, while the wiper 41 will be out of contact with the lug 38 so that the circuit will be completed from the battery by wire D to wiper 41ª, through collar 39, the series of disks 36, finger 27 to rod 31, thence to binding screw 44, thence by wire 43 to the ground. When the finger 27 is opposite any one of the disks 36 and the shaft 35 is rotated, a signal, in dots and dashes, will be transmitted to the recording instrument by making and breaking the circuit. The finger 27 is supported by an insulating block 27ª preventing the finger from contacting with any one of the disks when the finger overhangs groove 40.

In order to intermittently rotate the shaft 35 by the action of the float, the shaft is extended beyond the bearing in support 12, and disposed at this end of the shaft is a coiled spring 45 contained within a case 46, the spring acting as the motor for driving the shaft 35 and being connected thereto as follows: Mounted upon the shaft 35 is the sleeve 47 having two gear wheels 48 and 49, and the sleeve is operatively connected to the inner end of spring 45. The other end of spring 45 is engaged with a pin 50 carried by an escapement wheel 51 keyed upon shaft 35. Mounted on shaft 15 are two bushings 52 and 53 (see Figure 10). One bushing has a ratchet recess 54 in it inclined in one direction, while the other bushing 53 has a ratchet recess 55 inclined in the opposite direction (see Figures 11 and 12). Mounted upon these bushings 52 and 53 are the gear wheels 56 and 57, and the gear wheel 56 carries a spring actuated pawl 58 engageable upon a movement of the gear wheel 56 in one direction with the end of recess 54, while the other gear wheel 57 carries upon it the spring actuated pawl 59 engageable with the end of ratchet recess 55 upon a movement of this last named gear wheel in an opposite direction to the first named gear wheel. The gear wheel 57 engages directly with the gear wheel 49 but the gear wheel 56 engages with an intermediate idler gear wheel 60, which in turn meshes with the gear wheel 48. Thus, it will be obvious that a rotation of the shaft 15 in either direction will cause a rotation of the sleeve 47 in a direction to wind up the spring 45. It will be noted that the gear wheels 48 and 56 are smaller than the gear wheels 49 and 57. This pawl and ratchet engagement of the wheels 56 and 57 with the bushings 52 and 53, and thus with the shaft 15, causes the gear wheels 48 and 49 to always rotate in the same direction regardless of the direction of rotation of the selecting screw shaft 15, and this rotation acts to wind up the spring 45 and the tension of this spring 45, through the pin 50 and escapement wheel 51, acts to rotate the shaft 35 in one direction.

Figure 4:
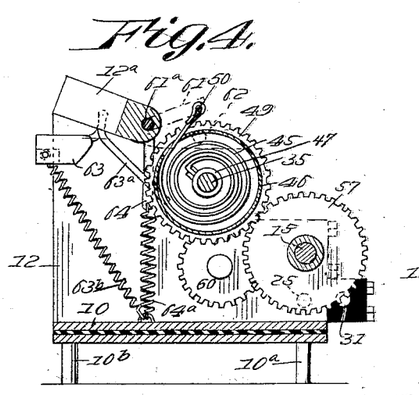
Figures 4 and 5 are sections on the line 4—4 and 5—5 respectively of Figure 1.
Figure 5:
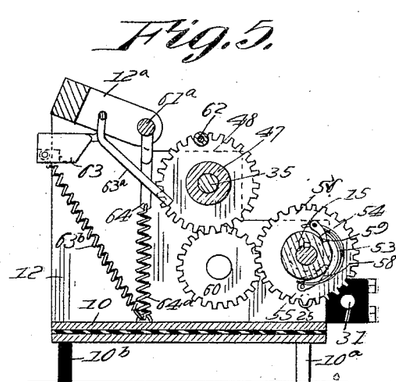

In order to prevent the continuous rotation of the shaft 35 under the action of the spring 45, but to cause an intermittent rotation of this shaft, that is an intermittent release of the shaft so that it may rotate under the action of the spring 45, I provide a pawl or stop 61 which is mounted rearward of the shaft 35 and which is normally in the path of movement of the pin 50, as illustrated in Figure 4, and prevents the rotation of the escapement wheel and shaft 14. To provide means acting upon a complete rotation of the shaft 15 to shift pawl 61 out of its position in front of the pin 50, I mount a roller 62 on gear wheel 49, and a hammer 63 is pivotally mounted in a supporting yoke 12ª carried by the support 12 at the rear thereof and extending over the wheels 48 and 49 and the spring. This hammer has an arm 63ª adapted to be struck by the roller 62. Pawl 61 is mounted upon a transverse shaft 61ª having a depending leg 64 connected to a coiled spring 64ª. The hammer is urged downward by a coiled spring 63ᵇ and thus once in every revolution of the sleeve 47, the roller 62 will engage the leg 63ª and the hammer will strike the arm 64 of the pawl, momentarily shifting the pawl from in front of pin 50, whereupon spring 45 will cause a rotation of the shaft 35. The pawl 61 immediately returns to its normal position and the pin 50 will strike pawl 61 and thus stop the rotation of shaft 35 until the pawl is again tripped.

In order to prevent the too rapid rotation of the shaft 35 under the action of the spring 45, I have formed the wheel 51 as an escapement wheel, that is this wheel 51 is provided in its periphery with a plurality of teeth 65, and in the base of the machine I pivot the weighted escapement pallet 66, which is in the form of an anchor escapement. The operation of the anchor escapement is well known and needs no particular description here, it being sufficient to say that the spring causes the rotation of the wheel 51, and the teeth being triangular in shape, it is obvious that one tooth will gradually force out the pallet tooth on one arm of the escapement, and the other arm of the escapement will be thrown into engagement with another tooth, and thus the anchor escapement will oscillate continuously, and intermittently permit the movement of the wheel 51 and of the shaft 35 through relatively short distances until the pin 50 engages the stop or pawl 61 when the shaft 35 is brought to a standstill.

In order to prevent the destruction of or injury to the machine in case, by any chance, the sprocket chain 17 should break, thus causing the weight or other retractile member on the end of the chain to cause the shaft 14 to race or run away, I have provided the clutch members 23 and 24 so as to automatically disconnect the shaft 14 from the threaded shaft 15 as the sliding block 26 nears one end or the other of its path of movement. To this end I engage a shipper yoke 67 with the annular groove 68 in the clutch member 24 and connect this shipper yoke to the sliding rod 25 mounted to slide in the members 11 and 12. This sliding rod adjacent one end is provided with a pin 69 with which the sliding block 26 engages when the sliding block has moved its full distance toward the left in Figure 1, that is its full distance toward the supporting member 12. When this happens, the sliding rod 25 is shifted toward the left in Figure 1, thus disengaging the clutch member 24 from member 23. It is, of course, to be understood that normally the proportions of the parts are such that the block 26 does not move toward the left in Figure 1 a distance sufficient to carry the finger 27 beyond the first of the series of disks 36 and that the block 26 does not ordinarily move to the right a distance more than sufficient to carry the finger 27 into contact with the last disk 36 of the series. In other words, the normal rise and fall of the float or the normal range of movement of the float under the rise and fall of the liquid in the container is strictly proportional to the normal range of movement of the finger 27 so that when the liquid in the container is at its highest mark, the finger 27 will be at one extreme of its normal movement, and when the float has reached the lowest point in its range of movement, the finger 27 will be at the other extremity of its normal range of movement.

For the purpose of disconnecting the clutch member 24 from the member 23 when the slide 26 has moved, under the influence of a run-away shaft 14, beyond its normal range of movement toward the right in Figure 1, I provide a lever 70 pivotally supported in any suitable manner rearward of the shaft 14 and operatively connected to the extremity of the rod 25 by a ball joint 70ª, and provide on the slide 26 the laterally projecting pin 71 which is adapted to pass through an opening 72 in the supporting member or standard 11 and contact with this member when the slide 26 is shifted the proper distance toward the right, and this will, of course, cause the shifting of the rod 25 toward the left and the disengagement of the clutch member 24 from 23.

The mechanism which I have described is intended to be connected in circuit with an indicating or recording device, as illustrated diagrammatically in Figure 14, wherein B designates the battery, C the register or recorder, and $d$ a relay disposed in the local circuit $c$ of this recording instrument. When this relay is energized it closes the circuit through the recording instrument and causes a record to be made in any usual or well known manner. Where one transmitting or signaling mechanism is used, the wire 43 is connected to a ground, as shown for the instrument at the right hand end of Figure 14, while the wiper 41ª at the left hand end of the instrument is electrically connected by the wire D, through the relay $d$ to the battery B and thence to the ground $b$. The wiper 41 contacts with the disk 38. This disk is in electrical engagement with the disks 36 and these disks are in electrical engagement with each other and with the disk 39.

Thus normally the current passes from the battery B through the relay $d$ to the wiper 41ª, thence to the disk 39, thence through disks 36 to disk 38, thence to the wiper 41 and thence to the wire 43 to the ground and back to the battery. The circuit is thus closed through the relay $d$ at all times and a circuit is thus closed through the magnet controlling the usual recording stylus $c'$ and the recording stylus is, therefore, depressed against the roller C which carries a tape in the usual manner and a continuous line is made upon this roller. When, however, any movement of the float 19 occurs, the chains 17 will be shifted and this will shift the screw shaft 15, shifting the contact 27 parallel to the axis of shaft 35. This through the mechanism heretofore described will act to release the pawl holding the shaft 35 from rotation and the shaft will be given a complete rotation in one direction. As this rotation commences, the contact finger 41 is thrown out of contact with the lug 38ª of disk 38 so as to break the circuit through the relay $d$, but as soon as a disk is rotated sufficiently to bring its toothed portion in engagement with the contact finger 27, a circuit will be completed from the battery B through the relay $d$, through wire D to contact 39, through the series of contact disks 36 to the particular contact disk with which the finger 27 is in engagement, through this contact finger 27, wire 31, and thence to the ground, thence to wire 43 at connection 44 and thence to the ground, and the rotation of the particular contact disk with which the finger 27 is engaged will cause the circuit through the relay to be made and broken a number of times, which in turn will make and break the local circuit $c$ which includes the magnet, which in turn controls the movement of the recording pen or stylus $c'$. If the float remains at this same level, then the shaft 35 will make one revolution and stop until the float rises or falls, when the shaft 35 will make another revolution. As soon as one revolution has been completed, the circuit is broken through the finger 27 because this finger rests in the groove 40 and the circuit is then again completed through the wire 43, the finger 41, the contact disk 38 and its lug $38^a$, the shaft 35, the disk 39, contact finger $41^a$, the wire D, the relay $d$ and the battery to the ground $b$, thus also completing the local circuit through the register or recorder and again holding the stylus or pen point down upon the recording strip.

A plurality of these signaling units, as above described, may be connected in series with the same recorder, as illustrated in Figure 14. In this case, the wire attached to the binding post on wiper $41^a$ of the first signal unit is extended to the binding post 44 of the next signaling unit in the series, and so on until the last unit is grounded to earth, for instance, for the return of current to the battery. Where a series of these instruments are connected up in the manner described and as shown in Figure 14, a circuit will be normally closed from the battery B, through the relay $d$, the wire D to the finger $41^a$, disk 39 of the instrument nearest the relay $d$, thence through disks 36 to the disk 38, then by finger 41 and wire 43 to the binding post 44, thence by a wire or other conductor to the contact finger $41^a$ of the next adjacent instrument, through the disks 39, 36 and 38, the finger 41 and wire 43 to the binding post 44 of this instrument and then to the contact finger $41^a$ of the next adjacent instrument, and so on to the ground connected to the binding post of the last instrument of the series. When, however, the shaft 36 of any one of these instruments is operated from its normal position, the finger 41 of this instrument will break its electrical engagement with the corresponding contact 38 and the finger 27 of this instrument will pass from out the groove 40 and engage one of the contacts 36 of this instrument and current will pass from the battery B, through the relay $d$, through the disks 36 of those instruments where the shaft 36 is not being rotated to the instrument whose shaft 35 is rotated, thence through the contact disks 35 thereof to the finger 27, and thence to the ground in an obvious manner. In order to make absolutely certain the insulation of the operating mechanism, the main frame should be completely insulated from the earth and from the sprocket wheel and chain 16 and 17. To this end, one of the clutch members 23 and 24 is of insulating material, and insulating material, is disposed between the base 10 and the longitudinal member $10^a$ which extends beneath the base. Bolts connecting this longitudinal member and the base plate 10 are insulated by insulating washers and the feet $10^b$ are of insulating material, and as before stated, the disks 36, while in electrical engagement with each other, are insulated from the shaft 35 on which they are mounted, and the rod 31 is also insulated from the main frame. As will be described hereafter more in detail, each of the signal disks in each unit is notched or otherwise formed so as to signal some common character, letter or number so as to distinguish the contact disks 36 of one unit from the contact disks or other units and thus to show from which unit any particular signal emanated.

The operation of this device will be obvious from what has gone before. Assuming that the level of liquid in the tank or container is stationary, it follows that no rotation in either direction will be given to the sprocket wheel 16 and to the shafts 14 and 15. As a consequence, the slide 26 will not move longitudinally and, of course, the shaft 35 will not move under the action of the spring 45 because the pawl 61 will prevent any rotation of the wheel 51 and thus of the shaft. If now the liquid rises in the container and the float 19 rises, it will be obvious that a rotation in one direction will be given to the shafts 14 and 15, thus causing the slide 26 to move in one direction. As the shaft 15 rotates, the roller 62 will trip the hammer 63. This hammer being spring-actuated, will return with force to its original position, tripping the pawl 61 and releasing the escapement wheel 51 and shaft 35. This shaft will then make one complete rotation. The contact finger 27 will at this time be opposite to one of the disks 36 and as a consequence, the complete rotation of the shaft 35 will cause this disk 36 to make and break the circuit in the local circuit of the recorder or indicator C, this signal being of a character peculiar to the particular disk opposite to which the contact finger 27 is disposed. Inasmuch as this signal is peculiar to that particular disk, and each disk is different, it is obvious that the signal which is delivered to the indicating or recording instrument will indicate the position of the float within the container. It will be also obvious that if the liquid in the container is rising or falling very rapidly, these signals will be delivered with a relatively short interval between each signal, while if the level of the liquid in the tank is rising or falling very slowly, a greater time will occur between each interval. The rotation of the shaft 15 through the action of the sprocket wheel 16 will, of course, cause a winding up of the spring 45, which spring is released and unwinds each time that the stop or pawl 61 is removed from its abutting engagement with the pin 50, but it is obvious that the spring will not run down, as after each release of the spring there is a period wherein the spring is wound up to its original tension again. As before remarked, if the chain 17 or the sprocket wheel 16 should break and the shaft 14 should rotate very rapidly in one direction or the other and to such an extent as to carry the slide 26 to one or the other of its extremes of movement, the clutch member 24 will be disengaged from the clutch member 23, thus stopping the mechanism entirely.

I have before referred to a float as being the moving body whose position in space is indicated by the signaling mechanism, but this is purely illustrative. It will be seen that I have provided in one unit a mechanism for transmitting electrical signals to indicate the changing position of a moving object, and that this is accomplished by the use of but one wire or conductor to transmit the various signals indicating the changing position of the object, and further that one circuit and source of energy may be used in connection with a number of these signal units, each indicating, for instance, the position of the float in a separate and distinct tank and container and indicating to a recording instrument the signals received from these various units.

It will further be obvious that the registering or recording instrument C may be located at a suitable distance from the unit and from the tank or other apparatus with which it is used. In my invention only one circuit need be used for a plurality of signaling mechanisms or units and the indicating, recording or registering mechanism C, excluding the local circuit of said recording mechanism.

It is to be understood that any suitable electrically actuated registering or recording instrument may be used in connection with my signaling mechanism. For instance, the "Morse recording device" known as a double pen ink writing register for Morse telegraph and driven by a key wound spring motor is suitable for this purpose. This recording device uses a paper tape, but a recording device having a single pen may be also used, or any other suitable recording device. This recording device is, of course, disposed in a local circuit, as is usual, which local circuit is closed or opened by means of a relay d disposed in the main circuit, in which main circuit my signaling unit is disposed.

In Figure 8 I illustrate one of the disks 36, which disk is intended to transmit the number "14" in dots and dashes. For this purpose the disk is formed to provide the groove 40 which is the "zero" groove, and then is cut to provide five teeth separated from each other by spaces. The first teeth are separated by a relatively wide space, as at a, to transmit a dash signal, while the next four teeth are separated from each other by relatively small spaces b to transmit dot signals, and thus when this disk rotates against the contact finger, the contact finger will transmit a dash followed by four dots, the dash indicating the numeral 10 and the four dots the numeral 4. Thus this particular disk or wheel will transmit the signaling number 14. For the reason that dash spaces require a great deal of room on a small disk and dot spaces only take up one-half the room of a dash space, I preferably form these wheels so that the dash spaces at the beginning or end of a signal indicate 10, and the dots, when used between dashes, indicate the number of 10's. Thus, for instance, a wheel to transmit the signal "32" will be formed to signal a — . — . . In this case, the first three dots and dashes will indicate 30 and the following two dots will indicate 2. If the disk is designed to send the signal "41," it will be cut so as to signal a — . . — . "74" would be indicated by a — . . . . . — . . . . Thus, the first and last of any series of 10 is indicated by a dash, dots being used to show the number of 10's between the dashes, and the last dash followed by dots denoting units.

Figure 2:
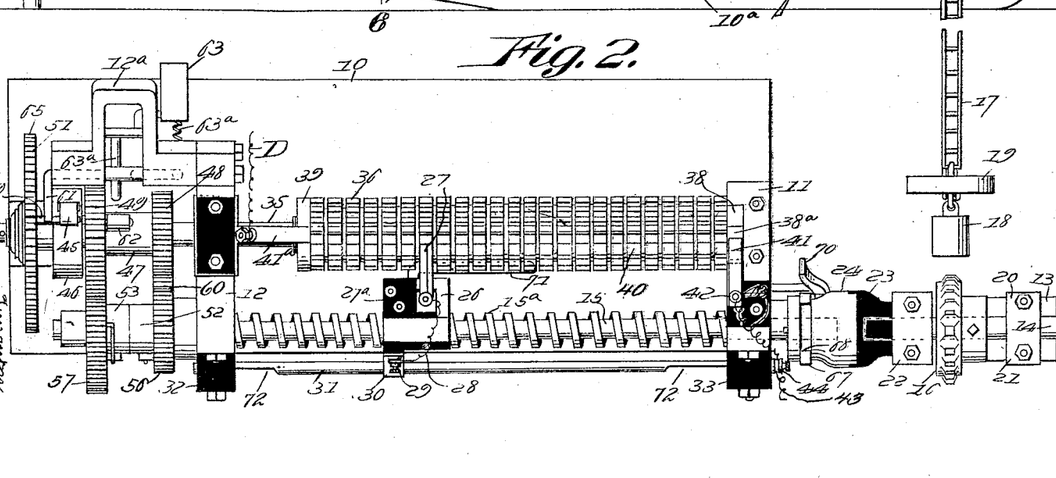
Figure 2 is a top plan view of the mechanism shown in Figure 1.
Figure 3:
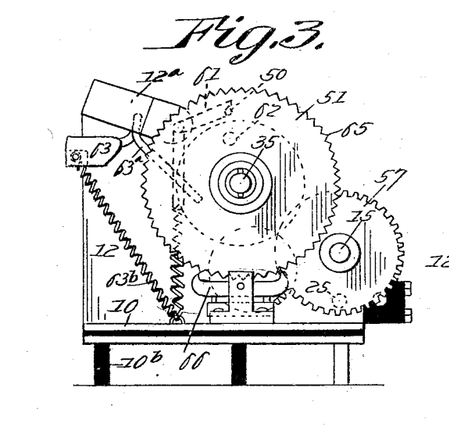
Figure 3 is an end elevation of the mechanism shown in Figure 1.

It will be noted from Figures 1 and 2 that the opposite ends of the bar or rod 31 are cut away, as at 72, so that when there is a run-away, as before explained, the sliding contact wiper 30 will drop into this cut-away portion, as for instance, at the left hand end of rod 31 and thus the current will be broken, the contact then not engaging the rod 31, and a bell E on the recorder circuit will ring until a visit is paid to the tank or other place where the signal is located and the difficulty fixed. The same thing occurs when the slide 26 moves under the action of a run-away float to the right hand end of the rod.

Figures 6, 7, 15:
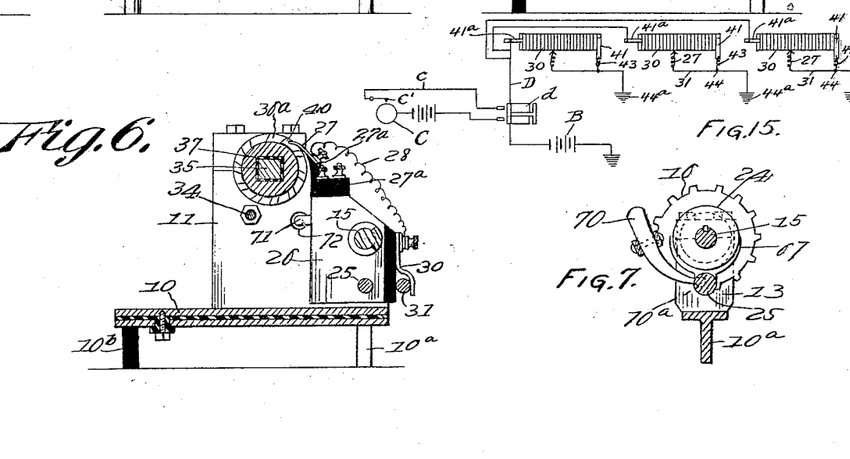
Figure 6 is a section on the line 6—6 of Figure 1.
Figure 7 is a section on the line 7—7 of Figure 1.
Figure 15 is a diagram showing my transmitting instruments connected up in parallel with the recorder.

While I have designed this mechanism to be used with a constant current such as from the Crowfoot battery used by all telegraph companies, and thus the machine works on a closed circuit, yet if circumstances should require the machine to be used on an open circuit, it will only be necessary to connect each of the contact fingers 41$^a$ in parallel to the wire D and remove the contact finger 41 to the wire 43 and ground each rod 31. Then obviously when any one of the shafts 35 are rotated, the circuit will be closed through the battery B, the relay $d$, wire D to the finger 41$^a$ of the particular instrument being operated, through the disk 39 thereof, through one or more of the contacts 36, through finger 27 and so to the ground 44$^a$ and back to the battery. The closing and opening of the transmitter circuit by the projections on the face of the disk 36 opposite which the finger 37 on the next instrument is located would, of course, make and break the circuit through the relay and this would make and break the local circuit through the recording or registering instrument. A diagram of this wiring is shown in Figure 15.

While I have illustrated a form of my invention which is relatively simple and compact, and which I have found to be thoroughly effective for the purpose intended, yet I do not wish to be limited to the details of construction and arrangement of parts illustrated, as it is obvious that many changes might be made therein without departing from the spirit of the invention.

I claim:—

1. An electric signal transmitting mechanism of the character described including a rotatable member having thereon a series of sets of contacts, each set of contacts being differently disposed relative to any other set of contacts whereby to transmit a different signal, a coacting contact member longitudinally movable parallel to the axis of the rotatable member, an element movable in space, and means controlled by the movement of said element acting to shift the longitudinally shiftable contact member and simultaneously rotate the rotatable member a predetermined amount.

2. An electric signal transmitting mechanism of the character described including a rotatable member having a series of contacts thereon, each contact having spaced contact portions thereon, the spaced contact portions of one contact being arranged differently from the spaced portions of any other contact to thereby cause a different signal to be transmitted, a contact member adapted to bear against any one of the series of rotatable contacts and being longitudinally movable parallel to the axis of the rotatable member, an element movable in space whose position is to be indicated, and means controlled by the movement of said element shifting the longitudinally movable contact and intermittently rotating said rotatable member.

3. An electric signal transmitting mechanism of the character described comprising a rotatable member including a series of rotatable contacts, each contact having on its face spaced contact portions differently arranged from the contact portions of any other contact member, a shiftable contact longitudinally movable parallel to the axis of the rotatable contacts, and electrically engageable with any one of said contacts, means causing the rotation of the rotatable contacts upon a movement in either direction of the shiftable contact and stopping the rotation of the rotatable contacts upon a cessation of movement of the shiftable contact, and an element movable in space and connected to the shiftable contact to move the latter.

4. A signaling mechanism including a series of approximately circular contacts rotatable coincidently about a common axis, a sliding contact finger movable parallel to the series of contacts and over the peripheral faces thereof, the peripheral face of each contact having thereon means for making and breaking a circuit through said contact finger as the contacts are rotated to thereby cause signals to be transmitted, the means on one contact being different from the means on the other contact to thereby cause different signals to be transmitted, a movable element operatively connected to said finger to cause its movement across the faces of said contacts, the contact finger being normally out of electrical engagement with the peripheral faces of said contacts, a source of current, means actuated by the movement of the contact finger acting to cause a predetermined rotation of the contacts, and means normally establishing a circuit through the entire series of contacts and the source of current and breaking a circuit through said entire series of contacts and completing the circuit through said contact finger and the contact in register therewith when the shaft is rotated.

5. A signal transmitter including a shaft, a series of approximately circular contacts mounted upon the shaft, a sliding contact finger movable over the peripheral faces of the contacts and parallel to the shaft, the peripheral face of each contact having thereon spaced portions adapted to make and break a circuit through said contact finger as the contacts are rotated to thereby cause signals to be transmitted, the signal transmitted from any one contact being different from the signal transmitted from any other contact, a motor for operating said shaft, means locking the shaft from rotation under the action of said motor, and means actuated by a movement of the finger parallel to the shaft releasing the shaft to permit its rotation by the motor, said locking means again locking the shaft from movement after the shaft has made a predetermined rotation, an element movable through space, and means operatively connecting said element with said contact finger to shift the latter.

6. A signaling mechanism including a shaft, a series of approximately circular contacts mounted upon said shaft, a sliding contact finger movable across the peripheral faces of said series of contacts and parallel to said shaft, a movable element operatively connected to said finger to cause its movement across the face of said contacts, the contacts of the series being electrically connected with each other, the peripheral face of each contact having thereon spaced portions adapted to make and break a circuit through said contact finger as the contact is rotated to thereby cause signals to be transmitted, the spaced portions on one of said contacts being differently arranged from the spaced portions on any other contact to thereby give different signals, and means actuated by the moving element for giving an intermittent rotation to the shaft constantly in the same direction without regard to the direction of movement of the moving element.

7. A signaling mechanism of the character described including a shaft, a series of circular contacts mounted upon the shaft and electrically connected with each other, a slide moving parallel to the shaft, a contact finger carried on the slide and moving over the several contacts of the series and electrically engaging the same, and each of said contacts having spaced portions adapted to make and break a circuit through the contacts on said finger, the spaced portions of each contact being adapted, upon rotation, to cause a different signal to be transmitted than is caused by any other contact, a member adapted to be shifted in one direction or the other by a moving element and operatively connected to said slide to cause the reciprocation of the slide parallel to said shaft, and mechanism operatively connected to said shiftable member to cause a complete rotation of the shaft upon the movement of the contact finger from engagement with one of said contacts into engagement with the next adjacent contact.

8. A signaling mechanism of the character described including a shaft, a series of circular contacts mounted upon the shaft and electrically connected with each other, a slide moving parallel to the shaft, a contact finger carried on the slide and moving over the several contacts of the series and electrically engaging the same, each of said contacts having spaced portions on its periphery adapted to make and break a circuit through the contacts on the finger, the spaced portions of each contact being differently arranged from the spaced portions of any other contact whereby to cause a different signal to be transmitted than is caused by any other contact, a member shifted in one direction or the other by a moving element and operatively connected to said slide to cause the reciprocation of the slide parallel to said shaft, and mechanism operatively connected to said shiftable member to cause one complete rotation of the shaft upon the movement of the shiftable member in either direction, said mechanism including a spring motor.

9. A signaling mechanism of the character described including a shaft, a series of circular contacts mounted upon the shaft and electrically connected with each other, a slide moving parallel to the shaft, a contact finger carried on the slide and moving over the several contacts of the series and electrically engaging the same, each of said contacts having spaced portions upon its periphery adapted to make and break the circuit through the contact finger, the signal transmitted from any one contact being different from the signal transmitted from any other contact, a member shiftable in one or the other direction by a moving element operatively connected to said slide to cause the reciprocation of the slide parallel to said shaft, mechanism controlled by said shiftable member to cause a complete rotation of the shaft upon a movement of the contact finger from engagement with one of said contacts into engagement with the next adjacent contact, said mechanism including a spring motor and means connected to said shiftable member causing the winding up of the spring motor.

10. A mechanism of the character described comprising a shaft, a series of disklike contact members mounted upon the shaft and electrically connected with each other, a slide movable parallel to the axis of the contact disks, a contact finger mounted on the slide and movable therewith and adapted to have contact with the contact disks, the peripheral face of each contact having thereon spaced portions adapted to make and break a circuit through said contact finger as the contact disks are rotated, said spaced portions being so arranged that the signal transmitted from any one contact is different from the signal transmitted from any other contact, a shaft having screw-threaded engagement with the slide to cause its movement in one or the other direction as the shaft is rotated in one or the other direction, means for rotating said shaft in one or the other direction, and means actuated by said screw-threaded shaft for giving a rotation to the first named shaft in a constant direction.

11. A signaling mechanism of the character described comprising a longitudinally extending shaft, a series of contact disks mounted thereon and rotatable therewith, the contact disks being in electrical engagement with each other, a screw-threaded shaft extending parallel to the first named shaft, a slide engaged and shifted thereby, a contact finger carried upon said slide and engageable with the contact disks, the series of disks, each of said disks having spaced portions upon its periphery adapted to make and break a circuit through said contact finger as the contacts are rotated, means for rotating the screw-threaded shaft in opposite directions, a spring operatively connected at one end to the first named shaft, a winding device operatively connected at its other end to said spring, means on the screw-threaded shaft for actuating the winding device to wind up said spring when the screw-threaded shaft is rotated in either direction, stop means normally preventing the unwinding of the spring, and means actuated by the rotation of the screw-threaded shaft in either direction to intermittently release said last named means to permit the unwinding of the spring and the rotation of the first named shaft, said stop means being returned to its active position after the release of said spring.

12. In a mechanism of the character described, a rotatable shaft, a series of contact disks mounted thereon and in electrical engagement with each other, a power actuated shaft, a contact finger operatively engaged by the power actuated shaft and shifted longitudinally of the contact disks in one or the other direction by the rotation of said power operated shaft in one or the other direction, each of said disks having thereon spaced portions adapted to make and break a circuit through said contact finger as the contacts are rotated, the signal transmitted from any one contact being different from the signal transmitted from any other contact, a spring motor operatively engaging the first named shaft and causing its rotation, means holding the spring motor from rotation, means actuated by the power operated shaft for intermittently releasing said motor holding means to cause the rotation of the first named shaft under the action of the spring motor through one revolution, and means operated by the power operated shaft for winding up the spring motor after each actuation of the first named shaft by the spring.

13. A signaling mechanism of the character described comprising a longitudinally extending shaft, a series of contact disks mounted thereon and rotatable therewith, the contact disks being in electrical engagement with each other, a screw-threaded shaft extending parallel to the first named shaft, a slide engaged and shifted thereby, a contact finger on said slide and engageable with the contact disks, each of said contact disks having on its periphery spaced portions adapted to make and break a circuit through the contact finger as the contact disks are rotated, each of said contact disks having spaced portions arranged to give a different signal from the spaced portions of any other contact disk, and the series of disks, means for rotating the screw-threaded shaft in opposite directions, a spring operatively connected to one end of the first named shaft, a winding device operatively connected to the other end of said spring, means operatively connecting the screw-threaded shaft and the winding device and acting to wind up said spring when the screw-threaded shaft is rotated in either direction, stop means normally preventing the unwinding of the spring, and means actuated by the rotation of the screw-threaded shaft in either direction to intermittently release said last named stop means to permit the unwinding of the spring and the rotation of the first named shaft, and means for returning the stop means to its active position after the release of said spring.

14. A mechanism of the character described including a power operated, screw-threaded shaft, a parallel shaft, a series of metallic disks mounted for rotation with the second named shaft, said disks being in electrical engagement with each other, a slide with which the screw-threaded shaft has screw-threaded engagement, a contact finger carried upon said slide and having electrical contact with the said disks upon a rotation of the shaft and disks, each of said disks upon its periphery having spaced portions adapted to make or break the circuit through the contact finger to thereby cause a series of signal impulses to be transmitted, the spaced portions of each disk transmitting a signal of a different character from the signal transmitted by the spaced portions of any other disk, a coil spring surrounding the second named shaft and having its outer end operatively connected thereto, a sleeve on the second named shaft to which the inner end of the spring is connected and having gear wheels, gear wheels on the screw-threaded shaft operatively engaging the first named gear wheels and causing a rotation of the first named gear wheels in one direction upon a rotation of the second named gear wheels and the screw-threaded shaft in either direction, a stop normally preventing the rotation of the second named shaft under the action of the spring, and means carried by said sleeve for tripping said stop to permit the rotation of the said shaft under the action of the spring, the stop immediately returning to its normal position and limiting the rotation of said shaft to one revolution.

15. A mechanism of the character described including a power operated, screw-threaded shaft, a parallel shaft, a series of metallic disks mounted for rotation with the second named shaft, said disks being in electrical engagement with each other, a slide with which the screw-threaded shaft has screw-threaded engagement, a contact finger carried upon said slide adapted to have electrical contact with the said disks upon a rotation of the shaft and disks, each of said disks upon its periphery having spaced portions adapted to make and break the circuit through said finger and cause a series of signal impulses to be transmitted, the spaced portions of each disk transmitting a signal of a different character from the signal transmitted by any other disk, a coil spring surrounding the second named shaft, an escapement wheel mounted upon the second named shaft and to which the outer end of the coil spring is connected, a sleeve mounted upon the second named shaft and independently rotatable thereon and to which the inner end of the spring is connected, said sleeve having a pair of gear wheels, a pair of gear wheels loosely mounted upon the screw-threaded shaft and one of said second named wheels directly engaging with one of the first named wheels and either gear wheel transmitting power from the other of said second named gear wheels to the other of the first named gear wheels, oppositely acting pawl devices carried by the second named gear wheels and operatively engaging the screw-threaded shaft to cause a rotation of one or the other of the second named gear wheels upon a rotation of the screw-threaded shaft, an escapement pallet operating in connection with the escapement wheel, a stop normally holding the escapement wheel from rotation under the action of said spring, and means carried by said sleeve on the second named shaft for tripping said stop to permit the rotation of the escapement wheel and its shaft through one revolution.

16. A mechanism of the character described including a series of contacts connected in electrical series with each other, a finger electrically engageable with said contacts and movable longitudinally therealong, a power operated shaft section, means normally connected with said shaft section for shifting said finger along said series of contacts in one direction or the other as the shaft section is rotated in one direction or the other, and means for operatively disconnecting said mechanism from said shaft section upon a movement of said finger in one direction or the other beyond a predetermined point.

17. A mechanism of the character described including a series of contacts in electrical engagement with each other, a screw-threaded shaft disposed parallel to said contacts, a slide carried by said shaft and carrying a contact finger electrically engageable with said contacts, a power operated shaft section rotatable in either direction under power, a clutch operatively connecting the shaft section to the screw-threaded shaft, and means actuated by a movement of said slide in either direction beyond a predetermined point unclutching the screw-threaded shaft from the power operated shaft.

18. Means for indicating the movement of an element through space including a movable element, a weight, a wheel, a connection extending between the movable element and the weight and extending over said wheel to cause a rotation thereof, a shaft section upon which the wheel is mounted, a screw-threaded shaft in alignment with the shaft section, a clutch normally connecting the screw-threaded shaft to the shaft section, a shaft extending parallel to the screw-threaded shaft and having thereon a series of metallic contact disks in electrical engagement with each other, a slide through which the screw-threaded shaft passes, the slide being shiftable in one or the other direction by a rotation of the screw-threaded shaft and of said wheel in one or the other direction, a contact finger carried by the slide and adapted to have electrical engagement with the contacts, means actuated by the shaft for causing an intermittent rotation of the shaft carrying the contacts through one revolution, and means for shifting said clutch and thereby operatively disconnecting the screw-threaded shaft from said wheel upon a movement of the slide in either direction beyond a predetermined point.

19. Means for indicating the movement of an element through space including a movable element, a weight, a wheel, a connection extending between the movable element and the weight and extending over said wheel to cause a rotation thereof, a shaft section upon which the wheel is mounted, a screw-threaded shaft in alignment with the shaft section, a shaft extending parallel to the screw-threaded shaft and having thereon a series of metallic contact disks in electrical engagement with each other, a slide through which the screw-threaded shaft passes, the slide being shiftable in one or the other direction by a rotation of the screw-threaded shaft and of said wheel in one or the other direction, a contact finger carried by the slide and adapted to have electrical engagement with the contacts, means actuated by the shaft for causing an intermittent rotation of the shaft carrying the contacts through one revolution, and means for operatively disconnecting the screw-threaded shaft from said wheel upon a movement of the slide in either direction beyond a predetermined point, said means including clutch elements normally in engagement with each other and disposed between the wheel and the screw-threaded shaft, a clutch shifting, slidable rod operatively connected to one of said clutch elements to shift it, said rod becoming engaged by said slide and shifted therewith to cause the unclutching of said elements upon a movement of the slide in one direction beyond a predetermined point, a lever operatively connected to said rod, said slide engaging said lever to shift it to unclutch said elements when the slide is moved beyond a predetermined point in the opposite direction.

20. A signaling transmitting mechanism including a series of different signal initiating elements, means supporting said elements for movement simultaneously in the same direction, a member for cooperation with said first named elements, means for moving said member at right angles to the direction of movement of said signal initiating elements so that the former may cooperate individually with any one of the latter, a movable element whose position in space is to be indicated, means connecting said movable element with said member moving means, means to shift said elements on the movement of the member from one initiating element to another, and signal means responsive to the cooperation of any initiating element with said member.

21. An electrical signaling mechanism including a rotatable shaft, a series of metallic contact members mounted upon the shaft and in electrical engagement with each other, said contacts being longitudinally grooved and being insulated from the shaft, a member at one end of said contacts having a segmental lug, a metallic collar at the other end of said contacts, a wiper engaging the collar, a wiper engaging the lug, said lug being disposed opposite the longitudinal groove in the contacts, and a contact finger movable longitudinally of the shaft and normally extending into said groove and out of electrical engagement with the contacts but electrically engaging the contacts upon a rotation of the shaft, said first and second named wipers and the contact finger being connected in circuit with a source of current and an indicating mechanism.

22. In a mechanism of the character described, a shaft, a spring operatively connected to the shaft to rotate it, a second power operated shaft, means controlled by said second shaft for winding up said spring upon a rotation of the second named shaft in either direction, and means controlled by the second named shaft for intermittently releasing said spring to permit the rotation of the first named shaft.

23. In a mechanism of the character described, a shaft, a spring operatively connected thereto to rotate it, a power operated shaft, means operated thereby for causing the winding up of said spring upon a rotation of the power operated shaft in either direction, a stop permitting the winding up of the spring but preventing its being unwound, and means for releasing said stop.

24. In a mechanism of the character described, a shaft, a spring operatively connected thereto to rotate it, a power operated shaft, means operated thereby for causing the winding up of said spring upon a rotation of the power operated shaft in either direction, a stop permitting the winding up of the spring but preventing its being unwound, and means controlled by the rotation of the power operated shaft for intermittently releasing said spring.

25. In a mechanism of the character described, a shaft, a coiled spring operatively connected at one end to said shaft, a sleeve having a pair of gear wheels thereon, one of said gear wheels being connected to the free end of the spring, a power operated shaft, a gear wheel thereon engaging with one of said first named gear wheels and having a ratchet connection to the power operated shaft whereby it is rotated in a direction to wind up the spring upon a rotation of the power operated shaft in one direction, a second gear wheel having a ratchet connection to the power operated shaft whereby it is rotated with the power operated shaft upon a reverse rotation of said shaft to that first named, and an intermediate gear engaging the second named gear wheel on the power operated shaft and the other gear wheel on said sleeve whereby a rotation of the power operated shaft in either direction will cause a winding up of said spring.

26. In a mechanism of the character described, a shaft, a coiled spring operatively connected at one end to said shaft, a sleeve having a pair of gear wheels thereon, one of said gear wheels being connected to the free end of the spring, a power operated shaft, a gear wheel thereon engaging with one of said first named gear wheels and having a ratchet connection to the power operated shaft whereby it is rotated in a direction to wind up the spring upon a rotation of the power operated shaft in one direction, a second gear wheel having a ratchet connection to the power operated shaft whereby it is rotated with the power operated shaft upon a reverse rotation of said shaft to that first named, an intermediate gear engaging the second named gear wheel on the power operated shaft and the other gear wheel on said sleeve whereby a rotation of the power operated shaft in either direction will cause a winding up of said spring, a stop preventing the unwinding of said spring, and means controlled by the rotation of the power operated shaft for intermittently releasing said stop.

27. An electrical signaling mechanism including a series of contacts all movable simultaneously in one direction, a contact member shiftable in a direction at right angles to the direction of movement of the first named series of contacts, a movable element whose position in space is to be indicated and operatively connected to the contact to move it in accordance with the movement of the movable element, and means actuated by the movement of said movable element for shifting the series of first named contacts simultaneously in a direction at right angles to the path of movement of said contact member when the contact member has shifted from one of the contacts of the series to the next adjacent contact.

28. A signaling transmitting mechanism including a series of different signal initiating contact elements, means for supporting said elements for movement simultaneously in the same direction, a contact member cooperating with the first named elements, means for moving said contact member at right angles to the direction of movement of said signal initiating elements and in electrical engagement therewith so that the former may cooperate individually with any one of the latter to transmit a signal, a movable element whose position in space is to be indicated, means connecting said movable element with said contact member moving means, means to shift said elements on the movement of the member from one initiating element to another, and an electrically operated signal responsive to the cooperation of any initiating element with said contact member.

In testimony whereof I hereunto affix my signature.

LECROY E. KING.